United States Patent [19]

Miyoshi et al.

[11] Patent Number: 4,495,315

[45] Date of Patent: Jan. 22, 1985

[54] PHOTO-DEGRADABLE STYRENE RESIN COMPOSITIONS

[75] Inventors: Hiroshi Miyoshi, Takatsuki; Hirohumi Mori; Yoriko Tanoue, both of Suita, all of Japan

[73] Assignee: Sekisui Kagaku Kogyo Kabushiki Kaisha, Osaka, Japan

[21] Appl. No.: 504,159

[22] Filed: Sep. 9, 1974

Related U.S. Application Data

[62] Division of Ser. No. 153,013, Jun. 14, 1971, abandoned.

[30] Foreign Application Priority Data

| Sep. 18, 1970 | [JP] | Japan | 45-82135 |
| Sep. 19, 1970 | [JP] | Japan | 45-82381 |
| Dec. 4, 1970 | [JP] | Japan | 45-107896 |
| Dec. 28, 1970 | [JP] | Japan | 45-126948 |

[51] Int. Cl.$^3$ ................................ C08F 8/50
[52] U.S. Cl. ................................ 523/125; 523/126
[58] Field of Search ............ 260/DIG. 43, 32.8 A, 260/23 S, 93.5 A; 523/125

[56] References Cited

U.S. PATENT DOCUMENTS

| 3,300,462 | 1/1967 | Guzzetta et al. | 260/DIG. 43 |
| 3,454,510 | 7/1969 | Newland et al. | 260/DIG. 43 |
| 3,548,059 | 12/1970 | Ishida et al. | 260/93.5 A |
| 3,592,792 | 7/1971 | Newland et al. | 260/DIG. 43 |
| 3,595,815 | 7/1971 | Willersinn et al. | 260/93.5 A |
| 3,759,807 | 9/1973 | Osborn et al. | 260/DIG. 43 |
| 3,825,627 | 7/1974 | McGaugh | 260/DIG. 43 |
| 3,888,804 | 6/1975 | Swanholm et al. | 260/DIG. 43 |

FOREIGN PATENT DOCUMENTS

| 1055814 | 4/1959 | Fed. Rep. of Germany . |
| 42-11489 | 6/1967 | Japan . |

OTHER PUBLICATIONS

Chem. Abstracts, vol. 68, 1968, p. 79359j, Rabek.
Macromolecules, vol. 1, No. 1, (1968), pp. 98–100, Trozzolo et al.
Journal of Applied Polymer Science, vol. 19, pp. 15–27, (1975), Mantovani et al.
Organic Chemistry of Synthetic High Polymers by Leng, pp. 759–765, Interscience Publishers, N.Y., (1967).
Chem. Abs., vol. 53, No. 22, p. 21842i, 1959.
Chem. & Eng. News, Jul. 27, 1970, p. 11.
Defensive Publication T861,015, Newland, published 2/27/69.

*Primary Examiner*—Paul R. Michl
*Attorney, Agent, or Firm*—Sherman & Shalloway

[57] ABSTRACT

A photo-degradable styrene resin composition which comprises a styrene resin and at least one photo-degradable agent selected from the group consisting of benzophenone, anthraquinone, fluorenone, xanthone, phenylalkylketones, phenacyl halides and derivatives of these compounds, and optionally at least one photo-degradable accelerator.

18 Claims, No Drawings

PHOTO-DEGRADABLE STYRENE RESIN COMPOSITIONS

This is a division of application Ser. No. 153,013, filed June 14, 1971, abandoned.

This invention relates to styrene resin compositions which deteriorate and disintegrate under sun light or ultra-violet rays.

In general, when synthetic resins are left to stand under the influences of nature, they deteriorate only with difficulty by efflorescing actions such as oxidation and ozonization or by putrefaction by microorganisms. Accordingly, synthetic resin articles such as plastic containers, bags, foams and other shaped articles still retain their original forms even after they are used and left under the influence of nature for a long period of time. For this reason, disposal of such used articles composed of synthetic resins involves various difficulties. In the present "age of plastics", plastic articles are utilized in all fields of modern living, and disposal of used plastic articles has now become one of great social problems. For instance, waste materials collected from households in cities or towns are thrown away in rivers, waste lands, reclaimed lands and the like, but great quantities of used synthetic resin articles contained in these waste articles still retain their original forms without undergoing deterioration, even after other waste materials have deteriorated and disintegrated. This phenomenon results in various social troubles such as industrial, sanitary and scenery-defiling troubles. If waste articles of synthetic resins are colleted separately from other waste articles and only synthetic resin articles are disposed in some way or other, it includes various difficulties. For instance, collection of such synthetic resin articles requires much labor and time. When they are burnt in incineration furnaces, black smokes or poisonous gases are inevitably generated. Further, in some synthetic resins, high temperatures are generated during the burning treatment, which results in extreme shortening of the life of an incineration furnace.

An object of this invention is to provide synthetic resin compositions, shaped articles of which deteriorate and disintegrate under influences of nature when they have been used and left outdoors, and which do not bring about the above-mentioned troubles with respect to disposal thereof.

More specifically, the object of this invention is to provide styrene resin compositions which are allowed to deteriorate and disintegrate easily under sun light or ultra-violet rays due to the presence of specific compounds incorporated therein.

In accordance with this invention, provided photo-degradable styrene resin composition is provided which consists essentially of a styrene resin and, incorporated therein, at least one photo-degradable agent selected from compounds expressed by the following general formula (I)

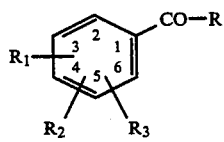

(I)

wherein R is a member selected from the class consisting of lower alkyl groups, halogenomethyl groups and groups represented by the formula

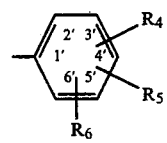

which may be bonded at the 2'-position to the 2-position of the benzene nucleus in the formula (I) directly or via —O— or —CO—; $R_1$, $R_2$, $R_3$, $R_4$, $R_5$ and $R_6$, which may be the same or different, stand for a member selected from the class consisting of hydrogen, halogen, hydroxyl, alkyl, alkoxy and nitro; when at least one of $R_1$, $R_2$, $R_3$, $R_4$, $R_5$ and $R_6$ is a hydroxyl group, such hydroxyl group is not bonded to the carbon atom of the benzene nucleus adjacent to the carbon atom of the benzene nucleus bonded to the —CO— group; and when R is halogenomethyl group, $R_1$, $R_2$ and $R_3$ are hydrogen or halogen atoms, in an amount sufficient to exhibit a photo-degradable effect.

As the halogen as $R_1$–$R_6$, fluorine, chlorine, bromine and iodine, may be exemplified and chlorine and bromine are especially preferred.

Methyl, ethyl, propyl, and butyl groups are included in the alkyl group as $R_1$–$R_6$. Methyl and ethyl groups are especially preferred.

As the alkoxy group as $R_1$–$R_6$, there may be methoxy and ethoxy groups may be exemplified, methoxy being especially preferred.

The photo-degradable mechanism of the photo-degradable agent of this invention expressed by the general formula (I) is construed, though it is not limited by the following reasoning, that the photo-degradable agent causes photo-excitation under sun light or ultra-violet rays, thereby extracting the hydrogen atom from the hydrogen-carbon linkage in a styrene-type polymer and as a result, promoting the degradation of the polymer by peroxidation of the polymer, reduction of the molecular weight by scission of the polymer chain, attenuation of the polymer by cross-linking or by other similar action. In contrast, in compounds where the hydroxyl group of $R_1$–$R_6$ is bonded to the carbon atom adjacent to the carbon atom of the benzene nucleus bonded to the —CO— group, for instance, 2-hydroxyl-benzophenone, the hydrogen bond is formed in the molecule as is shown below.

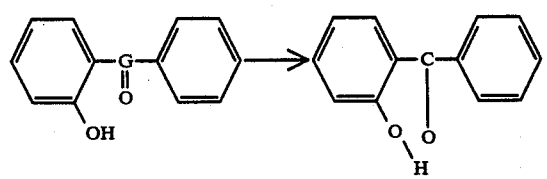

and the intended effect of promoting of photo-degradation cannot be attained, but on the contrary, such compounds exhibit an action of inhibiting the photo-degradation (namely an action of converting light energy to heat or other energy). In view of this fact, it is quite surprising that compounds of this invention expressed by the general formula (I) exhibit an action of promoting the photo-degradation.

Of the photo-degradable agents of this invention expressed by the general formula (I), benzophenone compounds expressed by the following formula (II) are most preferred:

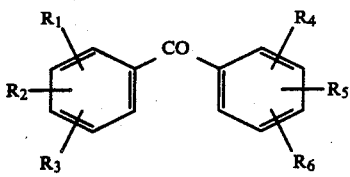

Typical examples of the benzophenone compound of the formula (II) are benzophenone, 4-chlorobenzophenone, 4-methylbenzophenone, 2-chlorobenzophenone, 4-bromobenzophenone, 3-hydroxybenzophenone, 4-hydroxybenzophenone, 2-methyl-4'-hydroxybenzophenone, 4-methyl-4'-hydroxybenzophenone, 3,5-dimethyl-4'-hydroxybenzophenone, 4,4'-dimethoxybenzophenone, 4-nitrobenzophenone, etc. These compounds are commercially available and possess a good compatibility with resins. Accordingly, these compounds are most preferably utilized in this invention. Further, since benzophenone type compounds have, in general, a low toxicity, they are preferably used for resins utilized for uses requiring direct contacts with foodstuffs, such as tableware, food containers and packing materials for foods.

A second group of compounds preferably used in this invention are anthraquinone compounds expressed by the following formula (III):

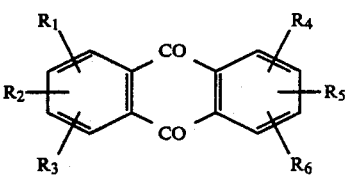

These photo-degradable compounds of the anthraquinone group are slightly inferior to those of the benzophenone type with respect to the compatibility with resins, but they exhibit a better photo-degradable activity than the compounds of the benzophenone type. Typical examples of the antraquinone compound expressed by the formula (III) are anthraquinone, 2-methylanthraquinone, 2-ethylanthraquinone, 1-chloroanthraquinone, 2-chloroanthraquinone, 1-bromoanthraquinone, 2-bromoanthraquinone, etc.

A third group of compounds expressed by the general formula (I) are fluorenone compounds expressed by the following formula (IV):

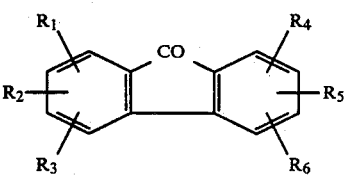

Of these compounds of the formula (IV), a compound in which each of $R_1$ to $R_6$ stands for a hydrogen atom, namely fluorenone, is most preferred.

A fourth group of compounds expressed by the general formula (I) are xanthone compounds expressed by the following formula (V):

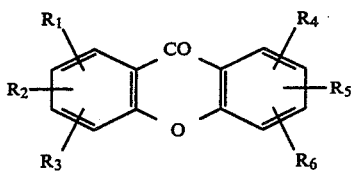

Typical examples of the xanthone compound of the formula (V) are xanthone, 2-chloroxanthone and the like.

Another group of compounds to be used as the photo-degradable compound in this invention are phenylalkylketones expressed by the following formula (VI):

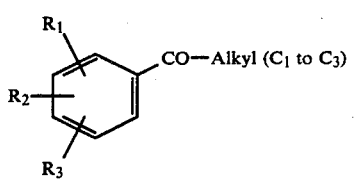

As the phenylalkylketone of the formula (VI) acetophenone, 3-bromoacetophenone, 4-bromoacetophenone, 2-methyl-4-chloroacetophenone, 3-methyl-4-chloroacetophenone, 3-methyl-4-bromoacetophenone, 2,4-dichloroacetophenone, 4-hydroxyacetophenone, 3-methyl-4-hydroxyacetophenone, 2,5-dimethyl-4-hydroxyacetophenone, 2-nitroacetophenone, 3-nitro-4-methylacetophenone, 3,5-dinitroacetophenone, propiophenone, 4-methylpropiophenone, 2,4-dichloropropiophenone, 4-bromopropiophenone, 3-methyl-4-chloropropiophenone, butyrophenone, 2,4-dichlorobutyrophenone, 4-hydroxybutyrophenone, 3-nitro-4-methylbutyrophenone, 2-nitroisobutyrophenone, 3-bromoisobutyrophenone, etc., may be exemplified.

Still another group of compounds within the scope of the photo-degradable agent of this invention are phenacyl halides expressed by the following formula (VII):

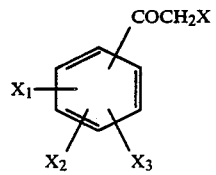

wherein X stands for a halogen atom, and $X_1$, $X_2$ and $X_3$ are hydrogen or halogen atoms.

Suitable examples of the phenacyl halide of the formula (VII) are phenacyl bromide, phenacyl chloride, 4-bromo-phenacyl bromide, 4-chloro-phenacyl bromide, 2-5-bromo-phenacyl bromide, 2-4-6-chlorophenacyl bromide and the like.

Any of the compounds expressed by formulas (II) to (VII) are effective as a photo-degradable agent for styrene type resins. However, use of benzophenone compounds of the formula (II) and anthraquinone compounds of the formula (III) is especially preferable because, as compared with other types of compounds, they are readily available at low costs and they exhibit good results in rendering styrene type resins photo-degradable.

Resins which are rendered photo-degradable by the above-mentioned photo-degradable agent are synthetic resins of the styrene type. The "synthetic resins of the styrene type" or "styrene type synthetic resins" used herein include homopolymers of styrene and its derivatives, and copolymers of two or more monomers selected from styrene and its derivatives, and copolymer of styrene or its derivative with a comonomer copolymerizable therewith. As the styrene derivative α-methylstyrene, methylvinylbenzene, ethylvinylbenzene, α-chlorostyrene, 4-chlorostyrene, 2,4-dichlorostyrene, 2,4,6-trichlorostyrene and the like may be exemplified.

As the comonomer copolymerizable with styrene or its derivative acrylic monomers such as methyl acrylate, ethyl acrylate, butyl acrylate, acrylic acid, methyl methacrylate, ethyl methacrylate, methacrylic acid and acrylonitrile; diene monomers such as butadiene and isoprene; and maleic acid, maleic anhydride, maleic acid esters, itaconic acid and esters thereof may be exemplified.

Examples of the copolymer applicable to this invention are a styrene-α-methylstyrene copolymer, a styrene-methyl methacrylate copolymer, styrene-acrylonitrile copolymer, a styrene-butadiene copolymer, a styrene-isoprene copolymer, an α-methylstyrene-methyl methacrylate copolymer, a styrene-butadiene-acrylonitrile copolymer, a styrene-methyl methacrylatebutadiene copolymer and the like.

These copolymers may contain at most 50 mole %, preferably at most 30 mole %, particularly preferably at most 20 mole %, of the units of such comonomer copolymerizable with styrene or its derivative.

Styrene resins preferably used for photo-degradable styrene resin compositions of this invention are a homopolymer of styrene and a copolymer of styrene with a diene monomer such as butadiene and isoprene. In the case of a copolymer of styrene with a diene monomer, as the content of the diene monomer increases, the tendency of the copolymer to readily deteriorate under sun light or ultra-violet ray increases and an excellent effect of the photo-degradation is attained coupled with poor weatherability inherent to such copolymer. However, the increase of the content of the diene monomer results in reduction of the desired mechanical properties, such as regidity, of the copolymer. Accordingly, in the composition of this invention it is desired to use a styrene-diene copolymer in which the content of the diene monomer is in the range of from 0.1 to 10% by weight.

In the styrene resin composition of this invention it is preferred that the photo-degradable agent is used in an amount of at least 0.01 part by weight per 100 parts by weight of the styrene polymer. When the amount of the photo-degradable agent is less than 0.01 part by weight per 100 parts of the styrene polymer, a sufficient photo-degradable effect cannot be obtained. In this invention, the upper limit of the amount used of the photo-degradable agent is not critical, but in view of physical properties and manufacturing costs of the end compositions it is preferred that the amount of the photo-degradable agent used is less than 10 parts by weight per 100 parts of the styrene resin, especially in the range of 0.05–5 parts by weight, more especially 0.1–1 part by weight, per 100 parts of the styrene resin.

In this invention, the photo-degradable agents may be used singly or in combination of two or more of them. When two or more agents are used in combination, it is sufficient that the total amount of the agents is within the above-mentioned range.

In preparing the photo-degradable composition of this invention, any method may be adopted, as long as it can disperse the photo-degradable agent uniformly throughout the styrene resin. For instance, the composition of this invention may be prepared merely by adding the photo-degradable agent to a styrene polymer. It is possible to adopt a method comprising adding the photo-degradable agent to a styrene type monomer optionally together with another copolymerizable co-monomer and then subjecting the blend to polymerization conditions. In any case, it is preferable to disperse the photo-degradable agent uniformly throughout the styrene type resin. For attaining such uniform dispersion state customary methods may be adopted such as a method comprising dissolving the photo-degradable agent homogeneously in the monomer system and then conducting the polymerization, a method comprising adding the photo-degradable agent to a styrene type polymer and then mixing them homogeneously by means of a blender or mixer, a method preparing a resin composition by kneading a molten mixture of a styrene type polymer with the photo-degradable agent with use of a pelletizer, and a method comprising melting a mixture of a styrene type resin with the photo-degradable agent, mixing the melt to form a homogeneous resin composition and shaping it to an article having a desired configuration.

It has been found that when a specific photo-degradable accelerator is incorporated into the styrene type resin composition of this invention comprising the above-mentioned styrene type resin and the photo-degradable agent, the photo-degradable property of the composition is further improved as compared with the composition comprising the photo-degradable agent alone.

Such photo-degradable accelerators to be used in this invention are divided into two groups. A first group of such accelerators includes transition metal compounds. The term "transition metal compound" used herein means compounds containing metals classified as transition elements. As suitable transition metal compounds to be used in this invention, organic compounds containing transition metals, especially transition metal salts of organic acids such as formic acid, acetic acid, stearic acid, oleic acid, oxalic acid and naphthenic acid, and organic chelete compounds such as acetyl acetonates may be mentioned. Of the transition metals, iron, cobalt, manganese and copper are preferred. Specific examples of such transition metal compounds to be preferably used in this invention are iron acetate, iron formate, iron stearate, iron oleate, iron naphthenate, iron acetyl acetonate, cobalt acetate, cobalt oleate, cobalt naphthenate, cobalt acetyl acetonate, manganese acetate, manganese oxalate, manganese oleate, manganese stearate, manganese acetyl acetonate, copper acetate, copper oxalate, copper oleate, copper stearate, copper acetyl acetonate and the like. Use of iron naphthenate and iron acetyl acetonate is especially preferred. These transition metal compounds may be used either singly or in admixtures of two or more of them.

When such transition metal compound is used in combination with the photo-degradable compound of this invention, it is used in an amount of 0.001–10 parts by weight, preferably 0.005–3 parts by weight, especially preferably 0.01–1 part by weight, per 100 parts by weight of the styrene type resin. In this invention it is desired that the total amount of the photo-degradable agent and the transition metal compound is 0.02–4 parts by weight, especially 0.1–1 part by weight, per 100 parts by weight of the styrene type resin. The weight of the photo-degradable agent: transition metal compound to be incorporated in the styrene type resin is preferably in the range of from 100:1 to 1:2. Of course, it is desired that the amount of the photo-degradable agent is larger than the amount of transition metal compound added within the above range, and in such case, the synergistic effect attained by the combined use is greater.

Another type of the photo-degradable accelerator to be used in this invention includes bromine compounds which contain at least one carbon atom to which two or more bromine atoms are bonded, especially organic bromine compounds. Preferable organic bromine compounds are brominated aliphatic hydrocarbons, particularly brominated products of aliphatic hydrocarbons having 1–10 carbon atoms. Examples of such bromine compound preferably used in this invention are dibromomethane, 1,1-dibromomethane, 2,2-dibromobutane, tribromomethane, tetrabromomethane, 1,1,2,2-tetrabromoethane, hexabromoethane, 2,2-dibromopropane, 1,1,2-tribromomethane, 1,1,1,2-tetrabromoethane, 3,3-dibromopentane, 2,2-dibromo-4-methylpentane, 3,3-dibromoheptane, 4,4-dibromopentane, 2,2-dibromooctane, and the like. Use of 1,1,2,2-tetrabromomethane is especially preferable. These bromine compounds may be used either singly or in combination. The amount of bromine compound used is 0.01–10 parts by weight, preferably 0.1–5 parts by weight, especially preferably 0.5–3 parts by weight, per 100 parts by weight of the styrene type resin. Such bromic compound is used in combination with the photo-degradable agent such that the total amount of the two is preferably 0.05–5 parts by weight, especially preferably 0.5–3 parts by weight, per 100 parts by weight of the styrene type resin.

Some of bromine compounds utilizable as the photo-degradable accelerator in this invention have an offensive smell. It is preferable to avoid incorporation of such bromine compounds when preparation of resin compositions for uses where such smell is undesired. However, since bromine compounds render resin products difficultly combustive, they are preferably utilized for uses requiring difficult combustibility.

In another embodiment of this invention, both the above-mentioned transition metal compound and bromine compound are used together with the photo-degradable agent. In this case, it is preferred that the total amount of the transition metal compound and bromine compound is 0.02–10 parts by weight, especially 0.1–3 parts by weight, per 100 parts by weight of the styrene type resin.

The above-mentioned photo-degradable accelerator, like the photo-degradable agent, may be added to a polymeric styrene type resin or to a monomer system which will be polymerized to a styrene type resin. The photo-degradable accelerator may be added either coincidentally with the photo-degradable agent, or before or after the addition of the photo-degradable agent. In any case, it is desired that the photo-degradable accelerator is dispersed homogeneously throughout the resin.

It will be readily understood that ordinary additives such as heat stabilizers, lubricants, fillers, pigments, high molecular weight substances, etc. can be incorporated in the styrene type composition of this invention according to need. Further, it is also possible to incorporate ordinary foaming agents or foam-generating substances into the styrene resin. In this case, a foam having a multicellular structure can be formed from the composition of this invention.

The styrene composition of this invention be shaped into articles of a desired configuration such as plates, sheets, films, tubes and various containers by conventional molding techniques. For instance, the composition is blended and kneaded by means of a mixing roll, a Bumbury mixer, an extrusion kneader, etc., and molded by means of an injection molder, an extruder, a molding press, a calender roll, etc.

Styrene resins usually used as plastics in various fields have a degree of polymerization in the range of from about 800 to 5000. When the degree of polymerization of such styrene resins is reduced to about 500 by a natural or artificial deteriorative action, the resins become fragile and are readily disintegrated. When the styrene resin composition of this invention is left alone outdoors and exposed to sun light or ultra-violet rays, the polymer component of the resin composition is deteriorated by an action of the photo-degradable agent incorporated into the resin and the degree of polymerization is therefore reduced. Although the degree of deterioration varies depending on the kind and polymerization degree of the styrene polymer, the amount of the photo-degradable used, the season and other factors, when the styrene composition of this invention is left outdoors for a period of about one week to several months, preferably 1–5 months, the composition molded to have a definite configuration is deteriorated to such a degree that the spontaneous disintegration is allowed to occur in the composition.

As described above, since molded or shaped articles from the composition of this invention are readily deteriorated and disintegrated under sun light or ultra-violet rays, especially when the styrene resin composition of this invention is used for thrownaway articles, unlike conventional synthetic resin products, they do not damage natural environments, and labor and time required for collection and incineration can be omitted.

This invention will now be detailed by referring to examples, but it must be noted that the scope of this invention is not limited by these examples.

EXAMPLE 1

One gram (1 g) of polystyrene having an average degree of polymerization of 1300 was dissolved in 10 ml of toluene, and 0.01 g of benzophenone was uniformly dispersed into the solution. The dispersion was poured and cast in a Petri dish and the solvent was evaporated at 50°–60° C. to form a film of a thickness of 0.2 mm. In the same manner as above, films of a thickness of 0.2 mm were prepared containing 4-bromobenzophenone, 4-methylbenzophenone, 4,4'-dimethoxybenzophenone, anthraquinone, 1-chloroanthraquinone, 1-bromoanthraquinone, 2-methylanthraquinone, fluorenone, xanthone and 2-xanthone, respectively, in an amount of 0.01 g per 1 g of the above polystyrene.

For comparison, a film of a thickness of 0.2 mm was prepared in the same manner without addition of any of the above-mentioned compounds.

Each of these films was subjected to irradiation of a 400 w. high pressure mercury lamp disposed 30 cm from the sample film.

The change in the degree of polymerization brought about by conducting the irradiation for a predetermined period is shown in Table 1.

TABLE 1

| Additive incorporated in styrene polymer | | Degree of polymerization after irradiation of high pressure mercury lamp | |
|---|---|---|---|
| Kind | Parts by weight per 100 parts of styrene polymer | After 20 hours | After 100 hours |
| benzophenone | 1 | 680 | 540 |
| 4-bromobenzophenone | 1 | 670 | 560 |
| 4-methylbenzophenone | 1 | 860 | 510 |
| 4,4'-dimethoxybenzophenone | 1 | 770 | 450 |
| anthraquinone | 1 | 560 | 450 |
| 1-chloroanthraquinone | 1 | 620 | 500 |
| 1-bromoanthraquinone | 1 | 595 | 480 |
| 2-methylanthraaquinone | 1 | 690 | 470 |
| fluorenone | 1 | 860 | 630 |
| xanthone | 1 | 720 | 490 |
| 2-chloroxanthone | 1 | 700 | 525 |
| (blank) | — | 1060 | 980 |

As is seen from the results shown in Table 1, in each of the compositions according to this invention the degree of polymerization was greatly reduced as compared with the blank composition. This fact illustrates that in the composition of this invention the degradation advances under the action of ultra-violet rays. Each of the films of compositions of this invention became very fragile after 100 hours irradiation of the high pressure mercury lamp, and it was crumbled only by touching it by fingers. Thus, such films could be readily pulverized. However, in the films prepared from the blank composition, such fragility was not observed.

EXAMPLE 2

Films were prepared in the same manner as in Example 1 while varying the amount of benzophenone incorporated. These films were subjected to irradiation of a high pressure mercury lamp for 100 hours in the same manner as in Example 1, and the change in the degree of polymerization was determined. Results are shown in Table 2.

TABLE 2

| Amount incorporated of benzophenone (parts by weight per 100 parts by weight of styrene polymer) | Degree of polymerization after 100 hours' irradiation of high pressure mercury lamp |
|---|---|
| 0.05 | 670 |
| 0.1 | 630 |
| 0.5 | 570 |
| 1 | 540 |
| 3 | 370 |
| 5 | 200 |
| 7 | 180 |

Each of the films prepared from the compositions of this invention became very fragile after 100 hours irradiation of the high pressure mercury lamp. Especially, the films prepared from the compositions incorporated with 3 parts by weight or more per 100 parts by weight of the polymer exhibited such a deterioration after 100 hours irradiation of the high pressure mercury lamp that their forms were readily disintegrated only by shifting them.

EXAMPLE 3

A polymerization vessel was charged with 100 parts by weight of a styrene monomer, 100 parts by weight of distilled water, 0.003 part by weight of sodium dodecylbenzenesulfonate, 0.2 part by weight of magnesium chloride, 0.25 part by weight of benzoyl peroxide and 2 parts by weight of benzophenone, and the mixture was heated to 90° C. under agitation. Then, 0.22 part by weight of sodium pyrophosphate was added to the mixture. The reaction mixture was maintained at the above temperature for 7 hours, and then the temperature was raised to 120° C. and the reaction mixture was maintained at this temperature for 2 hours to complete the polymerization. As a result a bead-like polymer having an average degree of polymerization of about 1300 was obtained.

Next, 100 parts by weight of the resulting styrene polymer, 100 parts by weight of distilled water, 0.2 part by weight of a surface active agent and 12 parts by weight of propane were charged in an autoclave, and the reaction mixture was maintained at a pressure of 17 Kg/cm$^2$ and a temperature of 50° C. for 10 hours to obtain beads of a foamable styrene polymer.

The foamable styrene polymer beads were placed into a mold and heated by steam to obtain a foam of an expansion ratio of about 80. The foam was cut into sample sheets having a thickness of 5 mm. In the same manner as above, a foam was prepared from a blank composition into which benzophenone had not been incorporated. The blank polymer had an average degree of polymerization of about 1300.

The outdoor exposure test and ultra-violet ray irradiation test were conducted with use of the so formed sample sheets.

In the outdoor exposure test, the sample sheet was fixed on a plate disposed to face south and inclined with an angle of 45° with the ground, and the sample was allowed to remain undisturbed in this state for 2 weeks. The ultra-violet ray irradiation was conducted in the same manner as in Example 1 for 100 hours with use of a high pressure mercury lamp.

With respect to each sample, changes in the degree of polymerization brought about by the outdoor exposure and ultra-violet ray irradiation was observed. Results are shown in Table 3.

TABLE 3

| | Degree of polymerization | |
|---|---|---|
| | After 2 weeks' outdoor exposure | After 100 hours' irradiation of ultra-violet ray |
| Benzophenone-containing foam | 440 | 410 |
| Blank foam | 1000 | 1020 |

As is seen from the results shown in Table 3, the reduction of the polymerization degree after the outdoor exposure or ultra-violet ray irradiation was very conspicuous in the benzophenone-containing foam as compared with the case of the benzophenone-free, blank foam. The benzophenone-containing foam which had been either exposed outdoor for 2 weeks or subjected to the ultra-violet ray irradiation for 100 hours was so deteriorated that it was readily crumbled when it was only picked by fingers. In contrast, in the blank foam such degerioration was not observed.

When the outdoor exposure was continued, it was found that in the case of the benzophenone-containing foam disintegration was gradually caused from its surface after two weeks had passed, and at the time when almost 4 weeks had passed, the disintegration was completed and the sample was entirely out of sight.

EXAMPLE 4

A mixture of 100 g of para-nitro-benzophenone and 10 Kg of pellets of a styrene polymer having a degree of polymerization of 1150 was extruded with use of an extruder of a screw diameter of 45 mm while maintaining a mold temperature at 180° C. to form a film of a thickness of 0.2 mm.

The film was subjected for 100 hours to irradiation of a high pressure mercury lamp disposed 30 cm apart from the film. By this irradiation, the degree of polymerization of the polymer was reduced to 575.

For comparison, a film was prepared in the same manner as above without addition of para-nitrobenzophenone. When it was subjected for 100 hours to irradiation in the same manner as above, the degree of polymerization was found to be 895.

EXAMPLE 5

One gram (1 g) of polystyrene having an average degree of polymerization of about 1300 was dissolved in 10 ml of toluene, and 5 mg of benzophenone and 5 mg of cobalt naphthenate were added to the solution and dispersed uniformly in the solution. The dispersion was poured into a Petri dish and cast therein. The solvent was evaporated at 50°-60° C. to form a film of a thickness of 0.2 mm.

In the same manner as above, polystyrene films of a thickness of 0.2 mm were prepared with use of combinations of compounds indicated in Table 4.

For comparison, a film of a thickness of 0.2 mm consisting only of polystyrene was also prepared.

Each of these sample films were subjected to irradiation of a high pressure mercury lamp disposed 30 cm from the sample.

Changes in the degree of polymerization were observed after 20 hours irradiation and after 100 hours irradiation. Results are shown in Table 4.

In each sample, the degree of polymerization of the polystyrene was about 1300 before initiation of the irradiation.

TABLE 4

| Run No. | Additives incorporated in Polystyrene — Kinds | Amounts added (parts by weight per 100 parts of polymer) | Degree of Polymerization After 20 hours' irradiation | Degree of Polymerization After 100 hours' irradiation |
|---|---|---|---|---|
| 1 | benzophenone | 0.5 | 480 | 360 |
|   | cobalt naphthenate | 0.5 | | |
| 2 | benzophenone | 0.5 | 550 | 350 |
|   | cobalt acetyl acetonate | 0.5 | | |
| 3 | benzophenone | 0.5 | 490 | 360 |
|   | iron acetyl acetonate | 0.5 | | |
| 4 | benzophenone | 0.5 | 470 | 360 |
|   | copper octylate | 0.5 | | |
| 5 | 4-methylbenzophenone | 0.5 | 490 | 380 |
|   | cobalt naphthenate | 0.5 | | |
| 6 | 4-methylbenzophenone | 0.5 | 730 | 440 |
|   | cobalt acetyl acetonate | 0.5 | | |
| 7 | 4-methylbenzophenone | 0.5 | 660 | 480 |
|   | iron acetyl acetonate | 0.5 | | |
| 8 | 4,4'-dimethoxybenzophenone | 0.5 | 490 | 360 |
|   | cobalt naphthenate | 0.5 | | |
| 9 | 4,4'-dimethoxybenzophenone | 0.5 | 530 | 410 |
|   | cobalt acetyl acetonate | 0.5 | | |
| 10 | 4,4'-dimethoxybenzophenone | 0.5 | 510 | 400 |
|    | iron acetyl acetonate | 0.5 | | |
| 11 | anthraquinone | 0.5 | 420 | 350 |
|    | cobalt naphthenate | 0.5 | | |
| 12 | anthraquinone | 0.5 | 400 | 300 |
|    | cobalt acetyl acetonate | 0.5 | | |
| 13 | anthraquinone | 0.5 | 370 | 290 |
|    | iron acetyl acetonate | 0.5 | | |
| 14 | anthraquinone | 0.5 | 420 | 320 |
|    | copper octylate | 0.5 | | |
| 15 | 2-methylanthraquinone | 0.5 | 440 | 370 |
|    | cobalt naphthenate | 0.5 | | |
| 16 | 2-methylanthraquinone | 0.5 | 450 | 360 |
|    | cobalt acetyl acetonate | 0.5 | | |
| 17 | 2-methylanthraquinone | 0.5 | 400 | 310 |
|    | iron acetyl acetonate | 0.5 | | |
| 18 | 2-chloroanthraquinone | 0.5 | 460 | 390 |
|    | cobalt naphthenato | 0.5 | | |
| 19 | 2-chloroanthraquinone | 0.5 | 460 | 380 |
|    | cobalt acetyl acetonate | 0.5 | | |
| 20 | fluorenone | 0.5 | 500 | 370 |
|    | cobalt naphthenate | 0.5 | | |
| 21 | xanthone | 0.5 | 490 | 370 |
|    | cobalt naphthenate | 0.5 | 1070 | 910 |

As is seen from the results shown in Table 4, in films of the compositions according to this invention, the degree of polymerization was very conspicuously reduced as compared with the case of the film from the blank resin. This fact illustrates that in the resin composition of this invention, the degradation due to ultra-violet ray is greatly enhanced.

Each of the film samples of the resin compositions according to this invention became very fragile after they have been subjected for 100 hours to irradiation of the high pressure mercury lamp. They were readily crumbled away only by picking them by fingers, and they could be easily pulverized. Such fragility was not observed in the film prepared from the blank resin even after 100 hours irradiation.

Further, when the results of Table 4 are compared with the results of Table 1, it is seen that the combined use of the photo-degradable agent and transition metal compound accelerates the deterioration of the styrene polymer as compared with the single use of the photo-degradable agent; namely, the combined use results in an excellent synergistic effecnt.

EXAMPLE 6

A cast film of a thickness of 0.1 mm was prepared from a benzene solution containing 50 mg of benzophenone, 50 mg of copper acetyl acetonate and 10 g of polystyrene (having a degree of polymerization of 1130). The film was subjected to irradiation of a 400 W. high pressure mercury lamp disposed 30 cm from the film. When the irradiation was conducted for 100 hours, the degree of polymerization of the polymer was 390.

A cast film of thickness of 0.1 mm was prepared similarly from a mixture of 90 mg of 1-bromoanthraquinone, 10 mg of manganese acetyl acetonate and 10 g of polystyrene (having a degree of polymerization of 1130), and the film was similarly subjected to irradiation of ultra-violet ray. After 100 hours irradiation, the degree of polymerization was reduced to 365.

EXAMPLE 7

A toluene solution of 10 g polystyrene having an average degree of polymerization of about 1300 incorporated with 0.1 g of 1,1,2,2-tetrabromoethane and 0.05 g of 2-methylanthraquinone was cast on a Petri dish and the solvent was evaporated. A film having a thickness of 0.2 mm was obtained.

The film was subjected to ultra-violet rays emitted from a 400 W. high pressure mercury lamp disposed 30 cm from the film. When the irradiation was conducted for 100 hours, the degree of polymerization was reduced to 315, and the film became very fragile and was readily crumbled away.

EXAMPLE 8

One gram (1 g) of polystyrene having an average degree of polymerization of about 1300 was dissolved in 10 ml of toluene, and 0.01 g of acetophenone was added to the solution and dispersed uniformly therein. The dispersion was cast into a Petri dish and the solvent was evaporated at 50°–60° C. to form a film having a thickness of 0.2 mm.

Films of a thickness of 0.2 mm were prepared in the same manner as above by employing, instead of acetophenone, 3-bromoacetophenone, 4-bromoacetophenone, 2-methyl-4-chloroacetophenone, 3-methyl-4-chloroacetophenone, 3-methyl-4-bromoacetophenone, 2,4-dichloroacetophenone, 4-hydroxyacetophenone, 3-methyl-4-hydroxyacetophenone, 2,5-dimethyl-4-hydroxyacetophenone, 2-nitroacetophenone, 3-nitro-4-methylacetophenone, 3,5-dinitroacetophenone, propiophenone, butyrophenone, phenacryl bromide, phenacryl chloride, 4-bromophenacylbromide and 4-chlorophenacyl bromide, respectively. Each of the above compounds was incorporated in an amount of 0.01 g per gram of the polystyrene.

For comparison, the above polystyrene not containing any of such additives as mentioned above was cast into a film of a thickness of 0.2 mm in the same manner as above.

Each of these films was subjected to irradiation of a high pressure mercury lamp disposed 30 cm from the sample.

After the irradiation had been continued for a prescribed period of time, the change in the degree of polymerization was oberved. Results are shown in Table 5.

In each sample film, the degree of polymerization of the polystyrene was about 1300 before initiation of the irradiation.

TABLE 5

| Additive Kind | Amount added (parts by weight per 100 parts by weight of polymer) | Degree of Polymerization After 20 hours' irradiation | Degree of Polymerization After 100 hours' irradiation |
| --- | --- | --- | --- |
| acetophenone | 1 | 710 | 450 |
| 3-bromoacetophenone | 1 | 790 | 550 |
| 4-bromoacetophenone | 1 | 760 | 510 |
| 2-methyl-4-chloroacetophenone | 1 | 720 | 530 |
| 3-methyl-4-chloroacetophenone | 1 | 760 | 520 |
| 3-methyl-4-bromoacetophenone | 1 | 730 | 500 |
| 2,4-dichloroacetophenone | 1 | 760 | 520 |
| 4-hydroxyacetophenone | 1 | 780 | 560 |
| 3-methyl-4-hydroxyacetophenone | 1 | 810 | 560 |
| 2,5-dimethyl-4-hydroxyacetophenone | 1 | 660 | 420 |
| 2-nitroacetophenone | 1 | 760 | 520 |
| 3-nitro-4-methylacetophenone | 1 | 730 | 500 |
| 3,5-dinitroacetophenone | 1 | 760 | 520 |
| propiophenone | 1 | 730 | 430 |
| butyrophenone | 1 | 720 | 460 |
| phenacyl bromide | 1 | 640 | 460 |
| phenacyl chloride | 1 | 710 | 460 |
| 4-bromophenacyl bromide | 1 | 720 | 490 |
| 4-chlorophenacyl bromide | 1 | 700 | 490 |
| blank | — | 1060 | 980 |

As is seen from Table 5, in the films of the compositions according to this invention the degree of polymerization was conspicuously reduced as compared from the film of the blank composition.

Each of the films of the resin compositions according to this invention became very fragile after 100 hours irradiation and was crumbled away only by picking it by fingers. Thus, such films could be pulverized quite readily.

In the film from the blank composition such fragility was not observed.

EXAMPLE 9

A film of a thickness of 0.2 mm was prepared in the same manner as in Example 8 except that 0.5 part by weight of acetophenone and 0.5 part by weight of cobalt naphthenate were added to 100 parts by weight of the same polystyrene as used in Example 8.

In the same manner as above, films of a thickness of 0.2 mm were prepared with use of combinations of acetophenone and iron naphthenate; 4-bromoacetophenone and cobalt naphthenate; 4-bromoacetophenone and iron naphthenate; phenacyl bromide and cobalt naphthenate; phenacyl bromide and iron acetyl acetonate; acetophenone and copper acetyl acetonate; and acetophenone and manganese acetyl acetonate. In each run, the proportions of the additives to the polystyrene were the same as above.

These films were subjected to irradiation of a high pressure mercury lamp in the same manner as in Example 8. The irradiation was continued for a prescribed period of time, and the change in the degree of the polymerization was observed. Results are shown in Table 6. In each sample, the degree of polymerization before the initiation of the irradiation was about 1300.

TABLE 6

| Run No. | Additives Kinds | Amount added (parts by weight per 100 parts by weight of polymer) | Polymerization After 20 hours' irradiation | Polymerization After 100 hours' irradiation |
| --- | --- | --- | --- | --- |
| 1 | acetophenone | 0.5 | 490 | 340 |
|   | cobalt naphthanate | 0.5 | | |
| 2 | acetophenone | 0.5 | 490 | 390 |
|   | iron naphthenate | 0.5 | | |
| 3 | 4-bromoacetophenone | 0.5 | 500 | 370 |
|   | cobalt naphthenate | 0.5 | | |

TABLE 6-continued

| Run No. | Additives Kinds | Amount added (parts by weight per 100 parts by weight of polymer) | Polymerization After 20 hours' irradiation | After 100 hours' irradiation |
|---|---|---|---|---|
| 4 | 4-bromoacetophenone | 0.5 | 480 | 350 |
|   | iron naphthenate | 0.5 |  |  |
| 5 | phenacryl bromide | 0.5 | 500 | 370 |
|   | cobalt naphthenate | 0.5 |  |  |
| 6 | phenacryl bromide | 0.5 | 590 | 390 |
|   | iron acetyl acetonate | 0.5 |  |  |
| 7 | acetophenone | 0.5 | 515 | 360 |
|   | copper acetyl acetonate | 0.5 |  |  |
| 8 | acetophenone | 0.5 | 510 | 325 |
|   | manganese acetyl acetonate | 0.5 |  |  |

EXAMPLE 10

A mixture of 10 g of a styrene-butadiene copolymer of a butadiene content of 0.72% by weight and an average degree of polymerization of 1450 with 0.1 g of 2-methylanthraquinone, a mixture of the same copolymer with 0.05 g of 2-methylanthraquinone and 0.05 g of iron tris-acetyl acetonate, a mixture of the same copolymer with 0.1 g of benzophenone and a mixture of the same copolymer with 0.1 g of benzophenone and 0.01 g of iron tris-acetyl acetonate was dissolved separately into 100 g of toluene. Films of a thickness of 0.1 mm were prepared from these solutions by the casing method.

Each of these films was subjected to irradiation of a 400 W. high pressure mercury lamp, and the degree of polymerization was determined 4 hours, 7 hours and 14 hours after initiation of the irradiation.

For comparison, a film of a thickness of 0.1 mm was prepared in the same manner as above from a solution of 10 g of the same styrene-butadiene copolymer as used above, and was subjected to irradiation of the mercury lamp in the same manner as above. The irradiation was continued for 24 hours and the degree of polymerization was determined.

Results are shown in Table 7.

TABLE 7

| Additives Kind | Amount added (grs. per 10 grs. of copolymer) | Degree of Polymerization After 4 hours' irradiation | After 7 hours' irradiation | After 14 hours' irradiation |
|---|---|---|---|---|
| 2-methylanthraquinone | 0.1 | 640 | 530 | 350 |
| 2-methylanthraquinone | 0.05 | 780 | 600 | 320 |
| iron tris-acetyl acetonato | 0.05 |  |  |  |
| benzophenone | 0.1 | 780 | 600 | 450 |
| benzophenone | 0.1 | 420 | 360 | 260 |
| iron tris-acetyl acetonate | 0.01 |  |  |  |
| blank | — | — | — | 900 (after 24 hours' irradiation) |

EXAMPLE 11

Films of a thickness of 0.1 mm were prepared in the same manner as in Example 10 from 10 g of a styrene-butadiene copolymer of a butadiene content of 2.1% by weight and an average degree of polymerization of 1520 incorporated with an additive(s) indicated in Table 8 in an amount indicated in Table 8. These films were subjected to irradiation of a high pressure mercury lamp in the same manner as in Example 10 and the degree of polymerization was measured after the irradiation had been continued for a prescribed period of time. For comparison, a film was prepared from the same copolymer without addition of any photo-degradable agent, and subjected to mercury lamp irradiation. The degree of polymerization was determined after 24 hours irradiation.

Results are shown in Table 8.

TABLE 8

| Additives Kind | Amount added (grs. per 10 grs. of copolymer) | Degree of Polymerization After 4 hours' irradiation | After 8 hours' irradiation | After 15 hours' irradiation |
|---|---|---|---|---|
| 2-methylanthraquinone | 0.1 | 530 | 420 | 320 |
| 2-methylanthraquinone | 0.1 | 290 | 250 | 190 |
| iron tris-acetyl acetonate | 0.01 |  |  |  |
| benzophenone | 0.1 | 500 | 390 | 340 |
| acetophenone | 0.1 | 630 | 530 | 340 |
| blank | — | — | — | 880 (after 24 hours' irradiation) |

EXAMPLE 12

A film of a thickness of 0.1 mm was prepared in the same manner as in Example 10 from a mixture of 10 g of a styrene-butadiene copolymer of a butadiene-content of 1.97% by weight and an average degree of polymerization of 1520 with 0.01 g of 2-methylanthraquinone and 0.1 g of 1,1,2,2-tetrabromoethane, and the film was subjected to mercury lamp irradiation in the same manner as in Example 10. After 24 hours irradiation, the degree of polymerization was reduced to 380.

For comparison, a film of a thickness of 0.1 mm was prepared from the same copolymer as above without addition of any additive, and the film was subjected to mercury lamp irradiation under the same conditions as above. After 24 hours irradiation, the degree of polymerization was 870.

EXAMPLE 13

A film of a thickness of 0.1 mm was prepared in the same manner as in Example 10 from a mixture of 10 g of a styrene-butadiene copolymer of a butadiene content of 0.71% by weight and an average degree of polymerization of 1180 with 0.01 g of benzophenone and 0.2 g of 1,1,2,2-tetrabromoethane. The film was subjected to mercury lamp irradiation in the same manner as in Example 10. After 20 hours irradiation, the degree of polymerization was reduced to 440.

For comparison, a film of a thickness of 0.1 mm was prepared in the same manner as above from the same copolymer as above with no additive, and the film was subjected to mercury lamp irradication under the same conditions as above. The degree of polymerization was 930 after 20 hours irradiation.

EXAMPLE 14

Ten grams (10 g) of polystyrene of an average degree of polymerization of 1130 were dissolved in 100 ml of toluene, and 0.04 g of benzophenone and 0.04 g of 2- chloroanthraquinone were added to the solution and dispersed uniformly therein. A film of a thickness of 0.2 mm was prepared from this dispersion by the casting method. When the film was subjected ultra-violet rays emitted from a high pressure mercury lamp disposed 30 cm from the film for 24 hours, the degree of polymerization was reduced to 580. For comparison, a film of a thickness of 0.2 mm was prepared in the same manner as above by using the same polystyrene as above without incorporating any additive therein, and the film was subjected to mercury lamp irradiation for 24 hours in the same manner as above. The degree of polymerization was 1020 after the irradiation.

EXAMPLE 15

A film of a thickness of 0.1 mm was prepared by the casting method from a mixture of 10 g of a copolymer of an average degree of polymerization of 1240 consisting of 5% by weight of α-methylstyrene and 95% by weight of styrene with 0.1 g of 2-methylanthraquinone. The film was subjected for 48 hours to irradiation of ultra-violet rays by a high pressure mercury lamp in the same manner as in Example 14. The degree of polymerization was reduced to 520.

When a film of a thickness of 0.1 mm prepared from the above copolymer with no photo-degradable agent incorporated therein was subjected to ultra-violet ray irradiation under the same conditions as above, the degree of polymerization was 1040.

EXAMPLE 16

A film of a thickness of 0.1 mm was prepared by the casting method from a mixture of 10 g of a copolymer of an average degree of polymerization of 1720 consisting of 3.7% by weight of isoprene and 96.3% by weight of styrene with 0.06 g of 2-methylanthraquinone and 0.01 g of iron naphthenate. When the film was subjected to high pressure mercury lamp irradiation for 24 hours in the same manner as in Example 14, the degree of polymerization was reduced to 280.

A film of a thickness of 0.1 mm prepared from the above copolymer without addition of any additive was subjected for 24 hours to irradiation of a high pressure mercury lamp under the same conditions as above. The degree of polymerization was 810 after the irradiation.

What we claim is:

1. A photo-degradable styrene resin composition which consists essentially of a polystyrene resin selected from one of the group consisting of a homopolymer of styrene and a copolymer of styrene with at most 50 mole percent of another comonomer copolymerizable therewith selected from the group consisting of methyl acrylate, ethyl acrylate, butyl acrylate, acrylic acid, methacrylic acid, methyl methacrylate, acrylonitrile, butadiene, isoprene, maleic acid, maleic anhydride, maleic acid esters, itaconic acid and itaconic acid esters, and, incorporated therein, at least one photo-degradable agent selected from compounds of the following formula

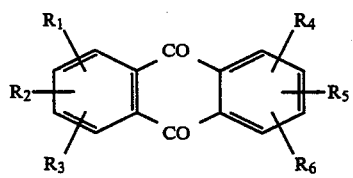

wherein $R_1$, $R_2$, $R_3$, $R_4$, $R_5$, and $R_6$, which may be the same or different, represent a member selected from the group consisting of hydrogen, chlorine, bromine, hydroxyl, methyl, ethyl, methoxy, ethoxy and nitro; with the proviso that when at least one of $R_1$, $R_2$, $R_3$, $R_4$, $R_5$, or $R_6$ is a hydroxyl group, said hydroxyl group is not present in an ortho-position to a —CO— group;
said photo-degradable agent being present in an amount sufficient to exhibit a photo-degradable effect.

2. The composition of claim 1, wherein said photo-degradable agent is selected from anthraquinone, 2-methyl-anthraquinone, 2-ethylanthraquinone, 1-chloroanthraquinone, 2-chloroanthraquinone, 1-bromoanthraquinone, 2-bromoanthraquinone, and mixtures thereof.

3. The composition of claim 1, wherein said polystyrene resin is a copolymer of styrene.

4. The composition of claim 1, wherein said polystyrene resin is a homopolymer of styrene.

5. The composition of claim 3, wherein said copolymer is a styrene-butadiene copolymer or a styrene-isoprene copolymer.

6. The composition of claim 1, wherein said photo-degradable agent is incorporated in an amount of at least 0.01 part by weight per 100 parts by weight of said styrene resin.

7. The composition of claim 6, wherein said photo-degradable agent is incorporated in an amount of 0.05 to 5.0 parts by weight per 100 parts by weight of said styrene resin.

8. The composition of claim 7, wherein said photo-degradable agent is incorporated in an amount of 0.1 to 1.0 part by weight per 100 parts by weight of said styrene resin.

9. The composition of claim 1, which further comprises at least one organic acid salt or organic chelate compound of a transition metal selected from the group consisting of iron, cobalt, manganese and copper.

10. The composition of claim 9, wherein aid transition metal compound is selected from iron acetate, iron formate, iron stearate, iron oleate, iron naphthenate, iron acetyl acetonate, cobalt acetate, cobalt oleate, cobalt naphthenate, cobalt acetyl acetonate, manganese acetate, manganese oxalate, manganese oleate, manganese stearate, manganese acetyl acetonate, copper acetate, copper oxalate, copper oleate, copper stearate, and copper acetyl acetonate.

11. The composition of claim 10, wherein said transition metal compound is iron acetyl acetonate or iron naphthenate.

12. The composition of claim 10, wherein said transition metal compound is incorporated in an amount of 0.001 to 10.0 parts by weight per 100 parts by weight of the styrene resin.

13. The composition of claim 12, wherein said transition metal compound is incorporated in an amount of 0.01 to 1.0 part per 100 parts by weight of the styrene resin.

14. Polymeric material photo-degradable upon disposal by exposure to radiation of sunlight or ultraviolet rays in an atmospheric environment comprising a mixture of a styrene resin selected from the group consisting of styrene homopolymers, homopolymers of styrene derivatives, copolymers of styrene with a monomer copolymerizable therewith; and a photo-degradable agent selected from the group consisting of

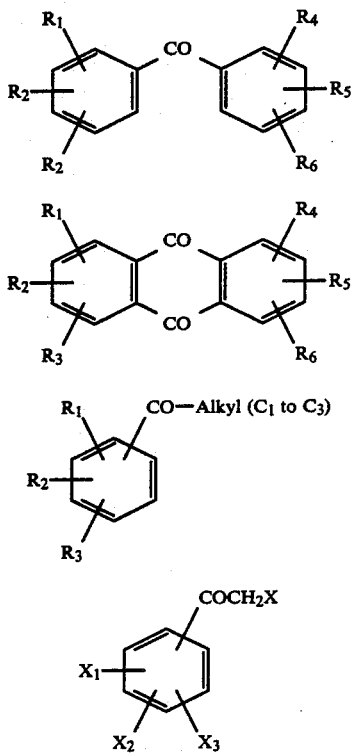

wherein $R_1$, $R_2$, $R_3$, $R_4$, $R_5$, $R_6$, which may be the same or different, represent a member selected from the group consisting of hydrogen, halogen, hydroxyl, alkyl and alkoxy, X stands for a halogen atom, and $X_1$, $X_2$ and $X_3$ are hydrogen or halogen atoms, when at least one of $R_1$, $R_2$, $R_3$, $R_4$, $R_5$ and $R_6$ is a hydroxyl group, said hydroxyl group is not present in an ortho-position to a —CO— group, wherein said photo-degradable agent comprises 0.01 to 10 parts by weight, per 100 parts by weight of said styrene resin.

15. The polymeric material of claim 14 wherein said photo-degrading agent is selected from the group consisting of benzophenone, anthraquinone, 4-chlorobenzophenone, 4-methylbenzophenone, 2-chlorobenzophenone, 4-bromobenzophenone, 3-hydroxybenzophenone, 4-hydroxybenzophenone, 2-methyl-4'-hydroxybenzophenone, 4-methyl-4'-hydroxybenzophenone, 3,5-dimethyl-4'-hydroxybenzophenone, 4,4'-dimethoxybenzophenone, 4-nitrobenzophenone, 2-methylanthraquinone, 2-ethylanthraquinone, 1-chloroanthraquinone, 2-chloroanthraquinone, 1-bromoanthraquinone, and 2-bromoanthraquinone.

16. The polymeric material of claim 14 which is in the form of a foam having a multicellular structure.

17. A method of deteriorating and disintegrating an article of manufacture containing as constituents the mixture of claim 14, which comprises the steps of exposing said article to radiation of sunlight or ultraviolet rays in the presence of oxygen for a period sufficient to initiate molecular degradation of said polymer.

18. A disintegradable packaging material comprising a predominance of the of the photo-degradable product of a styrene resin selected from the group consisting of styrene homopolymers, homopolymers of styrene derivatives, copolymers of styrene and a monomer copolymerizable therewith and copolymers of styrene derivatives and a monomer copolymerizable therewith; a photo-degradable agent selected from the group consisting of

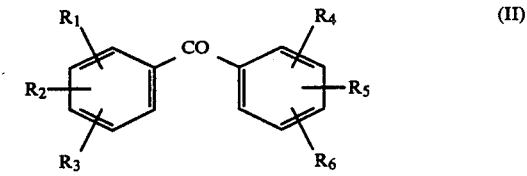

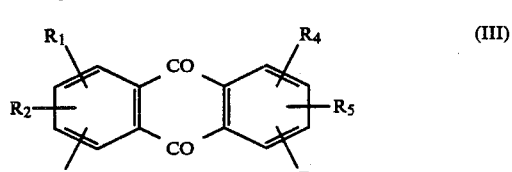

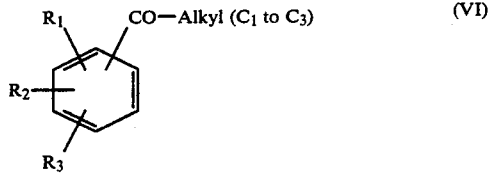

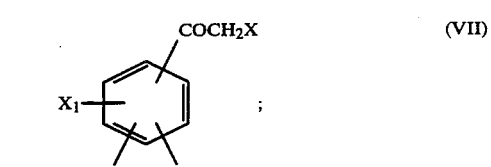

wherein $R_1$, $R_2$, $R_3$, $R_4$, $R_5$, $R_6$, which may be the same or different, represent a member selected from the group consisting of hydrogen, halogen, hydroxyl, alkyl and alkoxy, X stands for a halogen atom, and $X_1$, $X_2$ and $X_3$ are hydrogen or halogen atoms, when at least one of $R_1$, $R_2$, $R_3$, $R_4$, $R_5$, and $R_6$ is a hydroxyl group, said hydroxyl group is not present in an ortho-position to a —CO— group, oxygen and sunlight.

* * * * *